(12) United States Patent
Luo et al.

(10) Patent No.: US 12,530,285 B2
(45) Date of Patent: Jan. 20, 2026

(54) APPLICATION SOFTWARE TESTING METHOD, ELECTRONIC DEVICE AND COMPUTER-READABLE STORAGE MEDIUM

(71) Applicant: CRSC INSTITUTE OF SMART CITY RESEARCH & DESIGN, Beijing (CN)

(72) Inventors: Jing Luo, Beijing (CN); Jianzheng Dun, Beijing (CN); Pei Zhang, Beijing (CN); Xin Hou, Beijing (CN); Zijian Li, Beijing (CN)

(73) Assignee: CRSC INSTITUTE OF SMART CITY RESEARCH & DESIGN, Beijing (CN)

( * ) Notice: Subject to any disclaimer, the term of this patent is extended or adjusted under 35 U.S.C. 154(b) by 195 days.

(21) Appl. No.: 18/273,265

(22) PCT Filed: Jul. 18, 2022

(86) PCT No.: PCT/CN2022/106252
§ 371 (c)(1),
(2) Date: Jul. 19, 2023

(87) PCT Pub. No.: WO2023/178892
PCT Pub. Date: Sep. 28, 2023

(65) Prior Publication Data
US 2024/0394174 A1 Nov. 28, 2024

(30) Foreign Application Priority Data
Mar. 22, 2022 (CN) .................. 202210287129.X

(51) Int. Cl.
*G06F 9/451* (2018.01)
*G06F 11/07* (2006.01)
(Continued)

(52) U.S. Cl.
CPC ...... *G06F 11/3698* (2025.01); *G06F 11/3688* (2013.01); *G06F 8/71* (2013.01);
(Continued)

(58) Field of Classification Search
CPC ............. G06F 11/3698; G06F 11/3688; G06F 11/3438; G06F 11/3676; G06F 11/3664; G06F 11/3692; G06F 8/71
See application file for complete search history.

(56) References Cited

U.S. PATENT DOCUMENTS 10,164,848 B1 * 12/2018 Chen ................... G06F 11/3684
2011/0093773 A1 * 4/2011 Yee ....................... G06F 16/986
715/234
(Continued)

FOREIGN PATENT DOCUMENTS

CN 102724059 A 10/2012
CN 106844179 A 6/2017
(Continued)

OTHER PUBLICATIONS

WIPO, International Search Report issued on Dec. 28, 2022.
(Continued)

*Primary Examiner* — Anibal Riveracruz
(74) *Attorney, Agent, or Firm* — Li & Cai Intellectual Property (USA) Office

(57) ABSTRACT

Provided are an application software (APP) testing method, an electronic device, and a computer-readable storage medium. The APP testing method includes: acquiring a key log; determining information related to a tested fault cause according to the key log; acquiring a User Interface (UI) screenshot; and comparing the UI screenshot with a pre-stored UI design drawing, and determining whether there is a difference between the UI screenshot and the UI design drawing. The APP testing method provided by the present
(Continued)

disclosure can realize quick check of network access logs and crash logs even without a platform of a development tool, assist testers and developers in problem reproduction and fault location, and improve development efficiency of the developers.

8 Claims, 5 Drawing Sheets

(51) Int. Cl.
    *G06F 11/36*     (2025.01)
    *G06F 11/3668*     (2025.01)
    *G06F 11/3698*     (2025.01)
    *G06F 8/71*     (2018.01)
    *G06F 11/34*     (2006.01)

(52) U.S. Cl.
    CPC ...... *G06F 11/3438* (2013.01); *G06F 11/3676* (2013.01); *G06F 11/3692* (2013.01)

(56) References Cited

U.S. PATENT DOCUMENTS

| | | | | |
|---|---|---|---|---|
| 2013/0073718 A1* | 3/2013 | Kim | ............... | H04L 43/50 709/224 |
| 2014/0075344 A1* | 3/2014 | Bentrup | ............ | G06F 11/3684 715/760 |
| 2015/0082280 A1 | 3/2015 | Yahoo et al. | | |
| 2017/0161166 A1* | 6/2017 | Shivaprasad | ......... | G06F 11/079 |
| 2017/0192797 A1* | 7/2017 | Snir | ...................... | G06F 40/106 |
| 2019/0050323 A1* | 2/2019 | Kogan | ................ | G06F 11/3688 |
| 2021/0382770 A1 | 12/2021 | Lu et al. | | |
| 2022/0100637 A1* | 3/2022 | Koya | ................... | G06F 11/3624 |
| 2023/0055527 A1* | 2/2023 | Majithia | ............... | G06F 11/079 |
| 2023/0214856 A1* | 7/2023 | Morgan | .................. | H04L 61/58 705/7.29 |
| 2024/0184692 A1* | 6/2024 | Seaton | ............... | G06F 11/3688 |
| 2024/0427616 A1* | 12/2024 | Buster | .................... | G06F 9/454 |

FOREIGN PATENT DOCUMENTS

| | | | |
|---|---|---|---|
| CN | 107247637 | A | 10/2017 |
| CN | 108920380 | A | 11/2018 |
| CN | 109783360 | A | 5/2019 |
| CN | 110347524 | A | 10/2019 |
| CN | 113220581 | A | 8/2021 |
| CN | 113282971 | A | 8/2021 |
| CN | 114546881 | A | 5/2022 |

OTHER PUBLICATIONS

China Patent Office, the Notification to Grant for corresponding Chinese application 202210287129.X.

Jin Yu-dong, "Code Compressing and Dynamic Loading Implementation Based on ReactNative" dated Feb. 28, 2016 from «software».

* cited by examiner

APPLICATION SOFTWARE TESTING METHOD, ELECTRONIC DEVICE AND COMPUTER-READABLE STORAGE MEDIUM

CROSS REFERENCE TO RELATED APPLICATION

This is a National Phase Application filed under 35 U.S.C. 371 as a national stage of PCT/CN2022/106252, filed on Jul. 18, 2022,, an application claiming the benefit of Chinese Application No. 202210287129.X, filed on Mar. 22, 2022, the content of each of which is incorporated herein by reference in their entirety.

TECHNICAL FIELD

The present disclosure relates to the field of communications, and in particular, to an application software testing method, an electronic device, and a computer-readable storage medium.

BACKGROUND

With the rapid development of internet technology, various practical application software (APP) has emerged. In order to improve development efficiency and reduce development cost, various development assisting tools emerge in an endless stream, and can provide help for developers in development and test processes. A development process of an APP is not only a programming process of the developers, but also includes a product design phase, a software test phase, and other phases. An effective test method or tool can improve team communication efficiency, and can be beneficial to a whole development and testing team.

In current APP development processes, almost all the developers perform development while performing debugging, and need to use a development and debugging tool to capture logs for assistance in reproducing faults and locating root causes of the faults.

SUMMARY

The present disclosure provides an application software (APP) testing method, an electronic device, and a computer-readable storage medium.

In a first aspect, the present disclosure provides an application software (APP) testing method, including:
  acquiring a key log;
  determining information related to a tested fault cause according to the key log;
  acquiring a User Interface (UI) screenshot; and
  comparing the UI screenshot with a pre-stored UI design drawing, and determining whether there is a difference between the UI screenshot and the UI design drawing.

In some embodiments, the key log includes a network request log and/or an exception log.

In some embodiments, acquiring the key log includes:
  storing an interface request in a network request log and return data for the interface request in an interceptor;
  determining the information related to the tested fault cause according to the key log includes:
  analyzing the interface request and the return data in the interceptor, and caching an analysis result; and
  highlighting the information related to the tested fault cause in the analysis result.

Further, highlighting the information related to the tested fault cause in the analysis result includes:
  displaying a list of network request logs according to the analysis result;
  determining a network request log related to the tested fault cause according to a response code of each network request in the analysis result; and
  displaying the network request log related to the tested fault cause in a corresponding font color.

In some embodiments, acquiring the key log includes:
  acquiring an exception log in response to a system exception, wherein the system exception includes a crash and/or an operation exception; and
  storing the exception log in an exception log file;
  determining the information related to the tested fault cause according to the key log includes:
  reading the exception log file, and determining the exception log related to the system exception; and
  highlighting the exception log related to the system exception.

Further, acquiring the UI screenshot includes:
  taking a screenshot of a current UI page when an acceleration sensor monitors that a shaking value meets a predetermined condition; and
  drawing characters and/or graphic marks on the screenshot of the current UI page to obtain the UI screenshot.

In some embodiments, when the APP records the key log related to user page display, a UI screenshot taken at that time is saved, and acquiring the UI screenshot includes:
  determining whether the key log is related to the user interface display; and
  if the key log is related to the user interface display, acquiring, according to a moment recorded by the key log, the UI screenshot taken at the corresponding moment.

Further, comparing the UI screenshot with the pre-stored UI design drawing includes:
  superimposing the UI design drawing on the UI screenshot; and
  adjusting transparency of the UI design drawing, and displaying the difference between the UI screenshot and the UI design drawing.

In a second aspect, the present disclosure provides an electronic device, including:
  one or more processors;
  a memory having stored thereon one or more programs which, when executed by the one or more processors, cause the one or more processors to implement the APP testing method described in the first aspect; and
  one or more I/O interfaces connected between the one or more processors and the memory, and configured to enable information interaction between the one or more processors and the memory.

In a third aspect, the present disclosure provides a computer-readable storage medium having stored thereon a computer program which, when executed by a processor, implements the APP testing method described in the first aspect.

Compared with the prior art, the present disclosure can realize quick check of network access logs and crash logs even without a platform of a development tool, is more flexible in operation, more accurate in problem location, and strong in applicability, and can not only improve development efficiency of developers, but can also assist testers in problem reproduction and fault location, and greatly reduce communication cost in the aspect of team cooperation.

BRIEF DESCRIPTION OF DRAWINGS

The accompanying drawings are intended to provide a further understanding of the embodiments of the present disclosure and constitute a part of the specification. In conjunction with the embodiments of the present disclosure, the drawings are used to explain the present disclosure, but do not constitute any limitation to the present disclosure. The above and other features and advantages will become more apparent to those of ordinary skill in the art from the description of specific exemplary embodiments with reference to the drawings. In the drawings.

DETAIL DESCRIPTION OF EMBODIMENTS

In order to enable those of ordinary skill in the art to better understand the technical solutions of the present disclosure, an application software testing method, an electronic device, and a computer-readable storage medium will be described in detail below with reference to the drawings.

It should be understood that the specific embodiments described herein are just for explaining the present disclosure, rather than limiting the present disclosure.

In the following description, the terms such as "module", "component", and "unit" used to indicate elements are employed only for facilitating the description of the present disclosure, and those terms have no particular meaning in themselves. Thus, "module", "component", and "unit" can be used interchangeably.

In the current APP development processes, almost all the developers perform development while performing debugging, and need to use a development and debugging tool to capture logs for assistance in reproducing a fault and locating a root cause of the fault. However, if an APP to be debugged is disconnected from the development tool, for example, if a network request is suddenly disabled or the APP crashes when testers test the APP, the testers cannot capture the logs with the development and debugging tool, and reproduction of a fault can be only realized by performing operations over and over again by the testers and the developers. Such reproduction method is not only time-consuming, but is also low in probability of reproduction of a fault problem under the condition that no fault log is captured. Under the condition that the fault problem cannot be stably reproduced, location of a root cause of the fault problem also depends on the developers performing code check according to the experience thereof, which is low in location efficiency, and cannot ensure accuracy of a location result.

In view of the problem that a related log cannot be captured with the development and debugging tool, the applicant proposes a method of directly capturing a key log in a terminal equipment, so that, even in a case where connection is interrupted or an APP crashes, the key log can still be acquired automatically and quickly, information related to a fault cause can be determined, and key information can be displayed on a tool interface to help the testers and the developers to quickly reproduce a fault and locate a root cause of the fault, thereby improving troubleshooting efficiency and stability of a developed APP.

Figure 1:
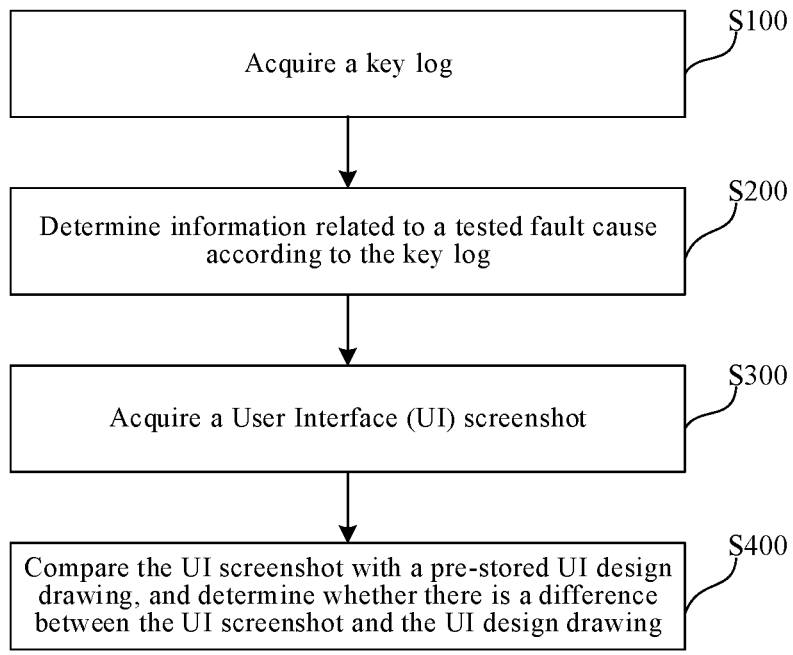
FIG. 1 is a flowchart of an APP testing method according to the embodiments of the present disclosure.

In a first aspect, the embodiments of the present disclosure provide an application software (APP) testing method. As shown in FIG. 1, the method includes:

step S100, acquiring a key log;

step S200, determining information related to a tested fault cause according to the key log;

step S300, acquiring a User Interface (UI) screenshot; and step S400, comparing the UI screenshot with a pre-stored UI design drawing, and determining whether there is a difference between the UI screenshot and the UI design drawing.

In some embodiments, the key log includes a network request log and/or an exception log.

As described above, when a network is disconnected or a system crashes or operates abnormally, the development and debugging tool cannot capture the related log. In view of this, the embodiments of the present disclosure provide the APP testing method, which acquires the key log directly from a terminal equipment, and automatically analyzes the acquired key log to identify the information related to the fault cause, so as to provide a basis for the testers to reproduce a fault problem and for the developers to locate a root cause of the fault.

Edition of a current developed UI screenshot is triggered in a preset screenshot manner, an original UI design drawing can also be imported into the same interface, and the current UI screenshot and the UI design drawing can be stacked and compared to obviously show a difference therebetween. For a UI-related log, a screenshot saved when the log occurs can be compared with the UI design drawing for test and analysis.

Figure 2:
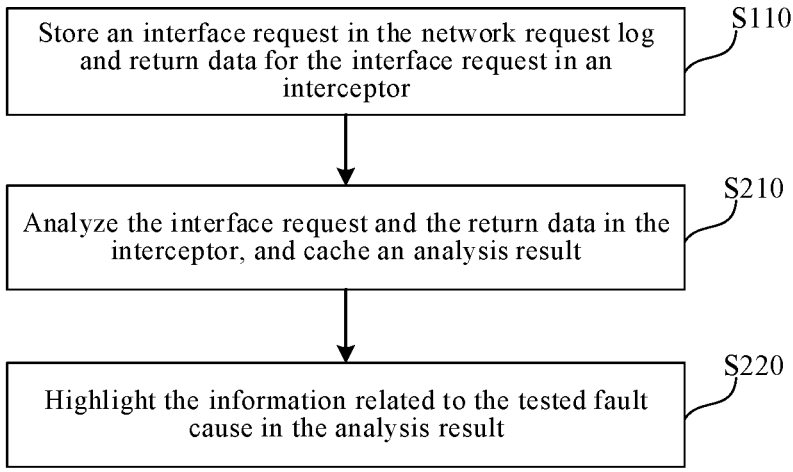
FIG. 2 is a flowchart of part of steps in the APP testing method according to the embodiments of the present disclosure.

In some embodiments, as shown in FIG. 2, acquiring the key log includes:

step S110, storing an interface request in the network request log and return data for the interface request in an interceptor.

Determining the information related to the tested fault cause according to the key log includes:

step S210, analyzing the interface request and the return data in the interceptor, and caching an analysis result; and step S220, highlighting the information related to the tested fault cause in the analysis result.

For a fault of network disconnection, the cause may be a code defect of APP software, or a problem occurring during a network protocol negotiation process. The interface request and the data returned therefor are captured by the interceptor every time the network request is sent, and related parameters are extracted and cached. For example, parameters corresponding to each network request, such as start time, request Uniform Resource Locator (URL), request method, request header, request parameter, response code, response header, return data, packet size, and duration, are captured. Through analysis and comprehensive judgment of the related parameters, the information related to the tested fault cause is found, and a corresponding network request log is highlighted, so as to enable the developers to conveniently locate the fault cause.

Figure 3:
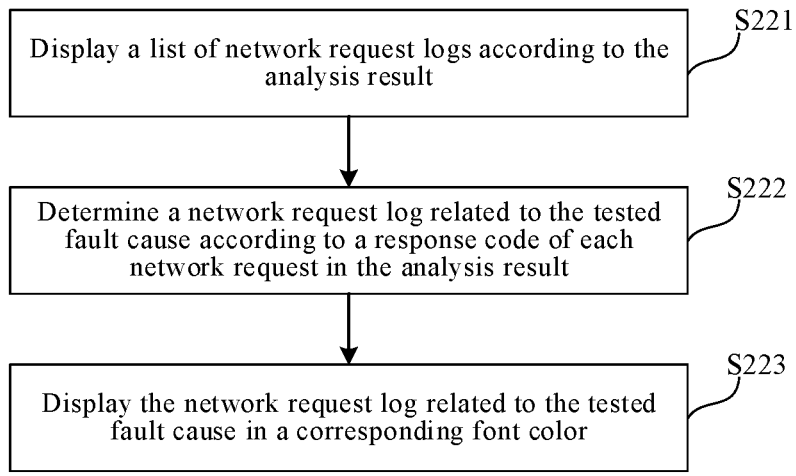
FIG. 3 is a flowchart of part of steps in the APP testing method according to the embodiments of the present disclosure.

Further, as shown in FIG. 3, highlighting the information related to the tested fault cause in the analysis result includes:

step S221, displaying a list of network request logs according to the analysis result;

step S222, determining a network request log related to the tested fault cause according to a response code of each network request in the analysis result; and step S223, displaying the network request log related to the tested fault cause in a corresponding font color.

Since the system may record information of each network request, all the network requests may be displayed. For displaying the network requests orderly, when the network request data in the interceptor is analyzed, the data may be formatted, for example, the data may be arranged in JSON format, so as to facilitate viewing data of each field in the network requests. As for a display form, all the network request logs may be displayed in the form of a network request log list, and the log related to the fault cause may be highlighted.

When an intercepted log is analyzed, a cause of connection interruption may be determined according to the response code of a network request. Different states are respectively set for a success and a failure of the request, so as to implement highlighting of the log. For example, when the response code of the network request is 400, etc., a fault cause can be determined quickly. Thus, different log display font colors may be preset according to the meanings of the response codes. When a network request log which possibly causes a fault appears in the network request log list, the network request log is displayed in a unique color, so that the developers and the testers can notice the log at a glance.

Further, if the cause of the connection interruption is a software defect, a related software method call stack and related parameters may be displayed to enable the developers and the testers to conveniently and visually see abnormal information which causes the connection interruption.

Figure 4:
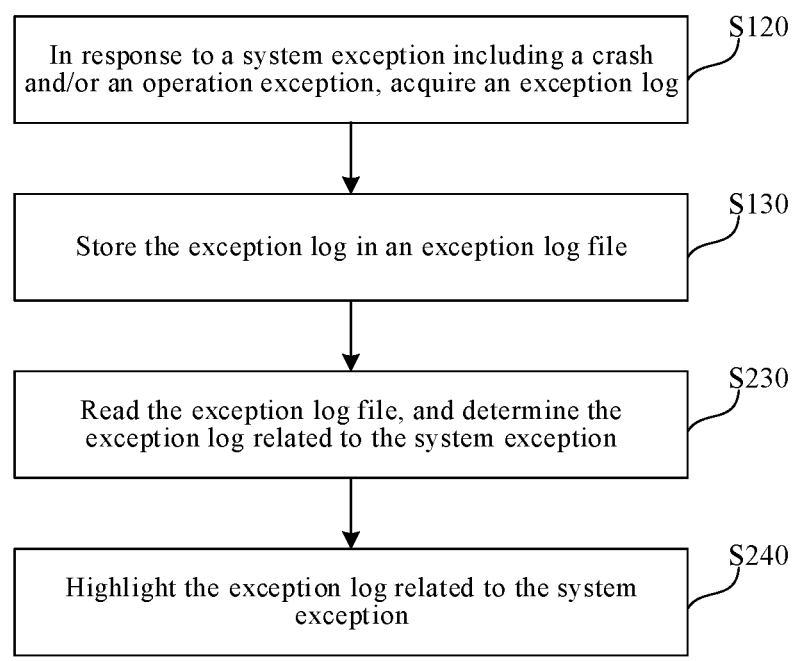
FIG. 4 is a flowchart of part of steps in the APP testing method according to the embodiments of the present disclosure.

In some embodiments, as shown in FIG. 4, acquiring the key log includes:

step S120, acquiring an exception log in response to a system exception including a crash and/or an operation exception; and step S130, storing the exception log in an exception log file.

Determining the information related to the tested fault cause according to the key log includes:

step S230, reading the exception log file, and determining the exception log related to the system exception; and step S240, highlighting the exception log related to the system exception.

As described above, besides a network access exception, faults such as the crash and the operation exception may also prevent the development and debugging tool from acquiring the related log. Unlike the network access exception, when the crash occurs, cached information may be emptied due to a restart of the APP. In view of this, the APP testing method provided by the present disclosure can trigger automatic capture of exception information in response to the faults such as the crash and the operation exception, and store the captured exception information in the exception log file, so that the content stored in the exception log file is not lost even if the APP is restarted after crash or the system is restarted.

In UI development, it is difficult to keep a final effect of an APP consistent with an effect of a design drawing, and some minor differences need to be determined through comparison by a designer himself, but the comparison process is time-consuming and is not efficient. A comparison function of a UI development interface and the design drawing can be further integrated into the APP testing method provided by the present disclosure.

Figure 5:
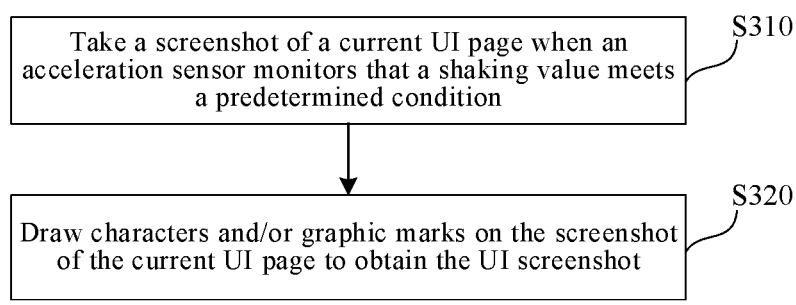
FIG. 5 is a flowchart of part of steps in the APP testing method according to the embodiments of the present disclosure.

Optionally, as shown in FIG. 5, acquiring the UI screenshot includes:

step S310, taking a screenshot of a current UI page when an acceleration sensor monitors that a shaking value meets a predetermined condition; and step S320, drawing characters and/or graphic marks on the screenshot of the current UI page to obtain the UI screenshot.

Different from a default screenshot mode of the system, a shaking mode or the like may be set to trigger edition of the screenshot of the current UI development interface, so as to perform the function to compare the screenshot of the current UI development interface with the original UI design drawing. Before the comparison, the screenshot of the current UI page may be edited to add the characters and/or the graphic marks, so that the UI screenshot and the original UI design drawing may be compared and annotated conveniently, and the difference therebetween may be displayed visually.

In some embodiments, when the APP records the key log related to user page display, a UI screenshot taken at that time is saved. Acquiring the UI screenshot includes:

determining whether the key log is related to the user interface display; and if the key log is related to the user interface display, acquiring, according to a moment recorded by the key log, the UI screenshot taken at the corresponding moment.

For a UI-related fault, only textual contents related to the fault are generally recorded in a log file during software running, so that the testers and the developers usually cannot directly see specific fault symptoms displayed on the UI when the fault occurs, and reproduction of the fault can only be realized by the testers manually, which is time-consuming and laborious, and is not beneficial to fault location and subsequent verification of a fault solving effect. With the application software according to the embodiments of the present disclosure, in a debugging mode, taking and saving a screenshot of a UI can be triggered while the key log related to the UI is recorded. Thus, in a test process, according to the acquired key log, whether the key log is related to the UI may be determined first, if it is determined that the key log is related to the user interface display, according to the moment recorded by the key log, the UI screenshot stored at that time may be acquired, so that the testers and the developers can visually see the fault symptoms displayed on the UI when the fault occurs, which facilitates analysis and location of the fault, identification of the fault, and subsequent comparison and verification of the fault solving effect.

Figure 6:
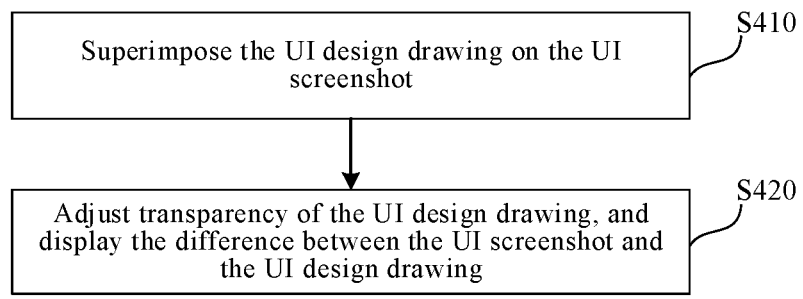
FIG. 6 is a flowchart of part of steps in the APP testing method according to the embodiments of the present disclosure.

Further, as shown in FIG. 6, comparing the UI screenshot with the pre-stored UI design drawing includes:

step S410, superimposing the UI design drawing on the UI screenshot; and step S420, adjusting transparency of the UI design drawing, and displaying the difference between the UI screenshot and the UI design drawing.

When the UI design drawing is superimposed on the UI screenshot, in order to facilitate the comparison of the upper image and the lower image, the transparency of the image may be customized by means of a sliding block, so that the difference between the two images can be seen more easily.

In order to make the objectives, technical solutions and advantages of the embodiments of the present disclosure clearer, specific implementations of the APP testing method described in a first aspect of the present disclosure in an actual testing process are further described in detail below in conjunction with three embodiments.

Embodiment 1

Figure 7:
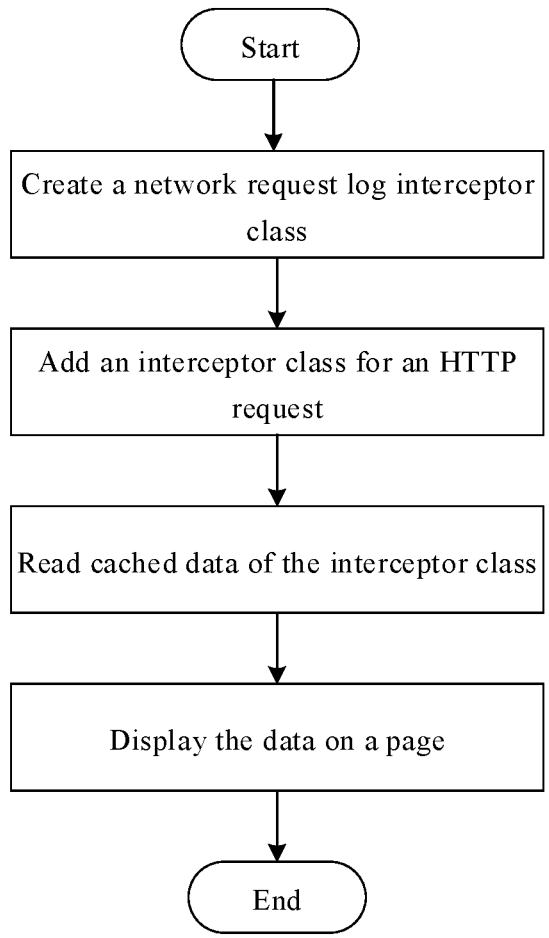
FIG. 7 is a schematic flowchart of an embodiment of the present disclosure where interception of a network interface log is implemented.

As shown in FIG. 7, an implementation method of an interception procedure of a network interface request log is further described in detail in the Embodiment 1. It should be noted that the embodiments of the present disclosure are applied to an APP in a development and test phase and are only applicable to the developers and the testers, but are not consumer-oriented. Therefore, a debugging mode needs to be started. When the APP is started, a tool start method is added, an error display show Bug( ) method is called in a create onCreate( ) method of application software (Application), and a suspend window permission is enabled in application settings. Such setting is adopted in the following Embodiments 2 and 3.

A network request log interceptor class is first created, a log interceptor (HttpLoggingInterceptor) class is added for a HyperText Transfer Protocol (HTTP) request with an addInterceptor( ) method in OkHttpClient of a network request, the network request and the return data are received through the HttpLoggingInterceptor, and a protocol message (ProcotolMessage) entity class is created in an interceptor( ) method in the HttpLoggingInterceptor, with the protocol message (ProcotolMessage) entity class including parameters such as start time, request URL, request method, request header, request parameters, response code, response header, return data, packet size, duration, and error code. A corresponding parameter is acquired through an interface request class, and intercepted data is cached.

A network request log list is created, the cached data of the interceptor class is read, a request interface and the start time are placed in a list view (ListView), and font colors are distinguished according to the response codes.

A weblog detail page is created, the data is introduced into the detail page by clicking on list data, and the data of the information of the request, such as the start time, a request address, a request mode, the request header, the request parameters, the response code, the response header, a return result, the packet size, the duration, and an error log, is displayed on the page in the set font colors.

Embodiment 2

Figure 8:
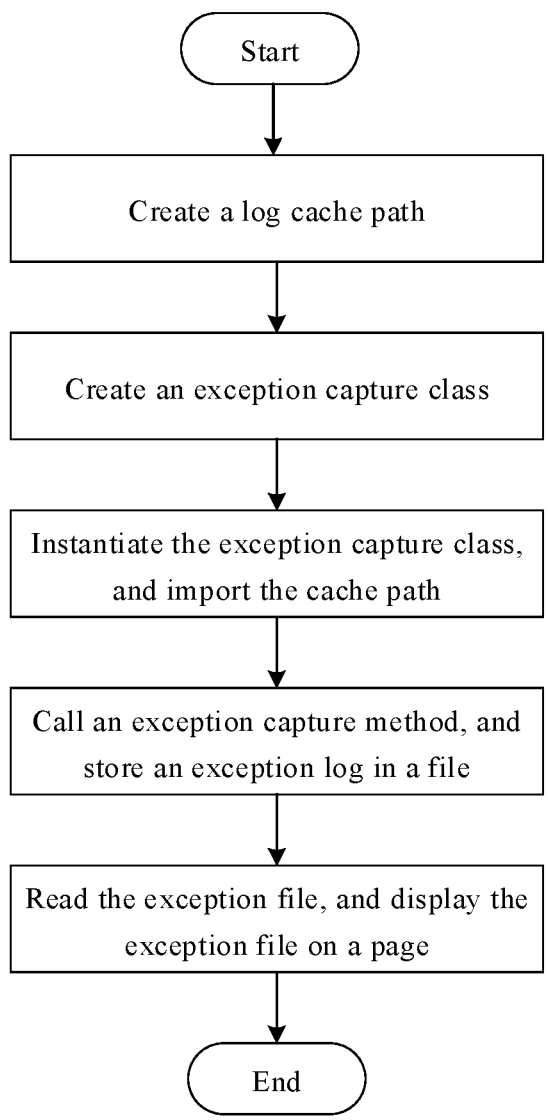
FIG. 8 is a schematic flowchart of an embodiment of the present disclosure where interception of a crash log is implemented.

As shown in FIG. 8, an implementation method of interception of a crash log is further described in detail in the Embodiment 2.

A log file cache path is created when a program is started.

A user exception handle (CustomExceptionHandler) class is created, and an exception capture handle is inherited to create an exception capture class (UncaughtExceptionHandler).

CustomExceptionHandler is instantiated, and the cache path is imported into CustomExceptionHandler.

An exception capture uncaughtExcaption method configured to capture a system exception log is re-written. When an exception of the APP occurs, the exception capture method is automatically called. In the uncaughtExcaption method, a text file is created according to the received file path and system time, and the exception log is written to the file by means of stream writing.

The exception file is read and displayed on a page, which specifically includes: creating an crash log activity (CrashLogActivity), opening a thread in a create onCreate( ) method of the CrashLogActivity, traversing the crash log file in the thread, reading all content of the log file in the form of streams, and respectively displaying each exception log in a list view (ListView).

Embodiment 3

Figure 9:
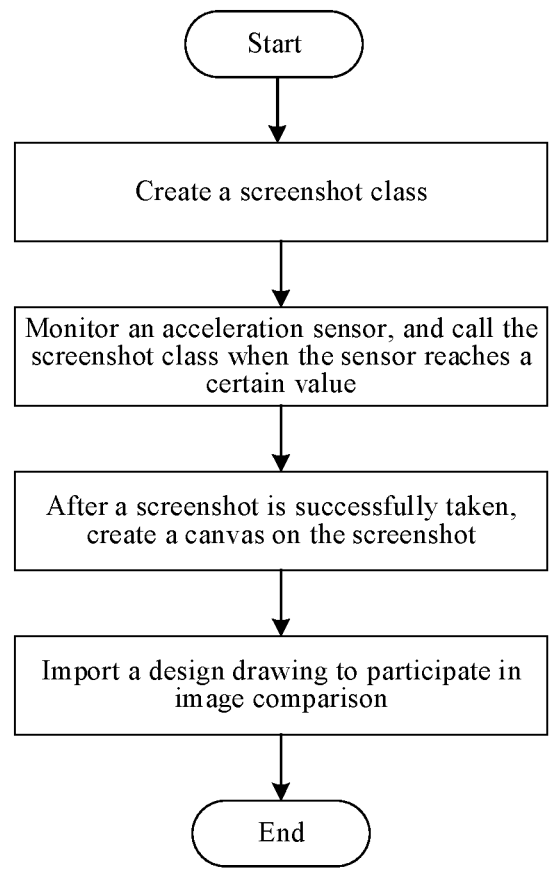
FIG. 9 is a schematic flowchart of an embodiment of the present disclosure where UI comparison is implemented.

As shown in FIG. 9, an implementation method of UI comparison is further described in detail in the Embodiment 3.

A screenshot class (ScreenShot) is created, in the ScreenShot class, an appointed activity (Activity) is generated to a bitmap, the bitmap is converted into an image, and the image is stored locally.

The acceleration sensor is defined and monitored, and a range is specified. When a terminal is suddenly shaken and the shaking value of the sensor reaches the specified range, it is specified that a shaking motion is performed, the screenshot class is called, and a screenshot of a current page is taken.

After the screenshot is successfully taken, a new page is popped up, and the screenshot is displayed on the new page. A canvas is created on the image of the screenshot, a drawing mode of a painting brush, a brush color, and a brush thickness are set on the canvas, and a brush monitor is bonded to determine whether a drawing process is being performed. The drawing process may be performed for a plurality of times.

After the drawing process is finished, the design drawing may be imported through a local file to participate in image comparison. The design drawing is superimposed on the screenshot, and the transparency of the design drawing is adjusted through sliding of the sliding block, so as to realize the comparison between the design drawing and the screenshot.

Figure 10:
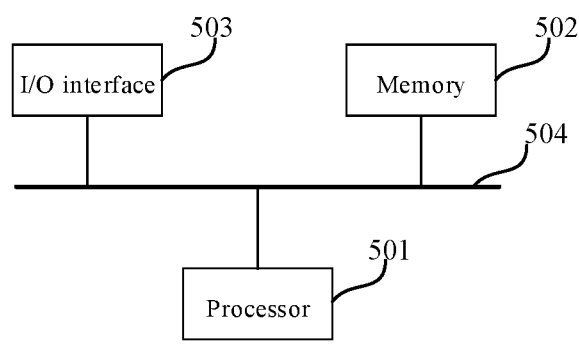
FIG. 10 is a schematic diagram of an electronic device according to the embodiments of the present disclosure.
Figure 11:
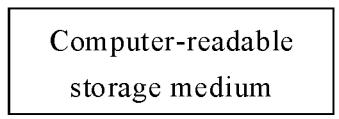
FIG. 11 is a schematic diagram of a computer-readable storage medium according to the embodiments of the present disclosure.

In a second aspect, the embodiments of the present disclosure provide an electronic device. As shown in FIG. 10, the electronic device includes:

one or more processors 501;

a memory 502 having stored thereon one or more programs which, when executed by the one or more processors, cause the one or more processors to implement the APP testing method described in the first aspect; and one or more I/O interfaces 503 connected between the processor(s) and the memory, and configured to enable information interaction between the processor(s) and the memory.

Each processor 501 is a device having data processing capability, and includes, but is not limited to, a Central Processing Unit (CPU): the memory 502 is a device having data storage capability, and includes, but is not limited to, a Random Access Memory (RAM, more specifically, a Synchronous Dynamic RAM (SDRAM), a Double Data Rate SDRAM (DDR SDRAM), etc.), a Read-Only Memory (ROM), an Electrically Erasable Programmable Read-Only Memory (EEPROM), and a flash memory (FLASH); and each I/O interface (read/write interface) 503 is connected between the processor(s) 501 and the memory 502, can enable the information interaction between the processor(s) 501 and the memory 502, and includes, but is not limited to, a data bus (Bus).

In some embodiments, the processor(s) 501, the memory 502, and the I/O interface(s) 503 are connected to each other through a bus 504, and then are connected to other components of a computing device.

In a third aspect, the embodiments of the present disclosure provide a computer-readable storage medium. As shown in FIG. 12, the computer-readable storage medium has stored thereon a computer program which, when executed by a processor, implements the APP testing method described in the first aspect.

Compared with the prior art, the present disclosure can realize quick check of network access logs and crash logs even without a platform of the development tool, is more flexible in operation, more accurate in problem location, and strong in applicability, and can not only improve the development efficiency of the developers, but can also assist the testers in problem reproduction and fault location, and greatly reduce communication cost in the aspect of team cooperation. In addition, the UI comparison function provided by the present disclosure can help the designers to perform problem annotation and UI comparison well.

It should be understood by those of ordinary skill in the art that the functional modules/units in all or some of the steps, systems and devices in the method disclosed above may be implemented as software, firmware, hardware, or suitable combinations thereof.

If implemented as hardware, the division between the functional modules/units stated above is not necessarily corresponding to the division of physical components: for example, one physical component may have a plurality of functions, or one function or step may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile and nonvolatile, removable and non-removable media used in any method or technology for storing information (such as computer-readable instructions, data structures, program modules and other data). The computer storage medium includes, but is not limited to, an RAM, an ROM, an EEPROM, a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The preferable embodiments of the present disclosure are described above with reference to the drawings, but are not intended to limit the scope of the claims of the present disclosure. Any modification, equivalent replacement and improvement made within the scope and essence of the present disclosure should be included in the scope of the claims of the present disclosure.

What is claimed is:

1. An application software (APP) testing method, the APP testing method is performed by a terminal equipment, comprising:
   directly acquiring a key log in the terminal equipment;
   determining information related to a tested fault cause according to the key log;
   acquiring a User Interface (UI) screenshot; and
   comparing the UI screenshot with a pre-stored UI design drawing, and determining whether there is a difference between the UI screenshot and the UI design drawing, wherein
   acquiring the key log comprises:
   storing an interface request in a network request log and return data for the interface request in an interceptor; and
   determining the information related to the tested fault cause according to the key log comprises:
   analyzing the interface request and the return data in the interceptor, and caching an analysis result; and
   highlighting the information related to the tested fault cause in the analysis result,
   wherein highlighting the information related to the tested fault cause in the analysis result comprises:
   displaying a list of network request logs according to the analysis result;
   determining a network request log related to the tested fault cause according to a response code of each network request in the analysis result; and
   displaying the network request log related to the tested fault cause in a corresponding font color.

2. The APP testing method of claim 1, wherein the key log comprises a network request log and/or an exception log.

3. The APP testing method of claim 1, wherein
   acquiring the key log comprises:
   acquiring an exception log in response to a system exception, wherein the system exception comprises a crash and/or an operation exception; and
   storing the exception log in an exception log file; and
   determining the information related to the tested fault cause according to the key log comprises:
   reading the exception log file, and determining the exception log related to the system exception; and
   highlighting the exception log related to the system exception.

4. The APP testing method of claim 1, wherein acquiring the UI screenshot comprises:
   taking a screenshot of a current UI page when an acceleration sensor monitors that a shaking value meets a predetermined condition, and
   drawing characters and/or graphic marks on the screenshot of the current UI page to obtain the UI screenshot.

5. The APP testing method of claim 1, wherein, when the application software (APP) records the key log related to user page display, a UI screenshot taken at that time that the application software records the key log is saved, and acquiring the UI screenshot comprises:
- determining whether the key log is related to the user interface display; and
- when the key log is related to the user interface display, acquiring, according to a moment when the key log is recorded, the UI screenshot taken at the corresponding moment.

6. The APP testing method of claim 1, wherein comparing the UI screenshot with the pre-stored UI design drawing comprises:
- superimposing the UI design drawing on the UI screenshot; and
- adjusting transparency of the UI design drawing, and displaying the difference between the UI screenshot and the UI design drawing.

7. An electronic device, comprising:
one or more processors;
a memory having stored thereon one or more programs which, when executed by the one or more processors, cause the one or more processors to implement the APP testing method of claim 1; and
one or more I/O interfaces connected between the one or more processors and the memory, and configured to enable information interaction between the one or more processors and the memory.

8. A computer-readable storage medium having stored thereon a computer program which, when executed by a processor, implements the APP testing method of claim 1.

* * * * *